(12) United States Patent
Naito

(10) Patent No.: US 11,985,412 B2
(45) Date of Patent: May 14, 2024

(54) DETACHABLE DEVICE AND CONTROL METHOD THEREOF

(71) Applicant: CANON KABUSHIKI KAISHA, Tokyo (JP)

(72) Inventor: Shoko Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 17/566,866

(22) Filed: Dec. 31, 2021

(65) Prior Publication Data

US 2022/0224829 A1 Jul. 14, 2022

(30) Foreign Application Priority Data

Jan. 12, 2021 (JP) .................................. 2021-003014

(51) Int. Cl.
| | |
|---|---|
| *H04N 23/617* | (2023.01) |
| *G06F 1/28* | (2006.01) |
| *G06F 13/38* | (2006.01) |
| *G06V 10/94* | (2022.01) |
| *H04N 23/80* | (2023.01) |

(52) U.S. Cl.
CPC ............ *H04N 23/617* (2023.01); *G06F 1/28* (2013.01); *G06F 13/385* (2013.01); *G06V 10/94* (2022.01); *H04N 23/80* (2023.01)

(58) Field of Classification Search
None
See application file for complete search history.

(56) References Cited

U.S. PATENT DOCUMENTS

2019/0332482 A1\* 10/2019 Shen .................... G06F 11/0745

FOREIGN PATENT DOCUMENTS

JP 2016052057 A 4/2016

OTHER PUBLICATIONS

SD specification part 1 physical layer simplified specification version. 5.00, SD Card Association, Aug. 10, 2016, XP055560630, Retrieved from the Internet: URL:http://www.sdcard.org.
Kristiani Endah, et al., On Construction of Sensors, Edge, and Cloud (iSEC) Framework for Smart System Integration and Applications, IEEE Internet of Things Journal, vol. 8, No. 1, Jun. 22, 2020, XP011827319.

\* cited by examiner

*Primary Examiner* — James M Hannett
(74) *Attorney, Agent, or Firm* — Canon U.S.A., Inc. IP Division

(57) ABSTRACT

A detachable device having an arithmetic apparatus and capable of attaching/detaching to/from an electric device obtains an instruction for a reconfiguration from the electric device. The detachable device, prior to the reconfiguration being executed, saves, to a storage unit, state information that represents a state of an interface of the arithmetic apparatus that is for receiving a signal from the electric device; and sets the state of the interface using the state information after a predetermined standby time.

14 Claims, 9 Drawing Sheets

DETACHABLE DEVICE AND CONTROL METHOD THEREOF

BACKGROUND OF THE DISCLOSURE

Field of the Disclosure

The present disclosure relates to a detachable device and a control method thereof.

Description of the Related Art

High-performance arithmetic apparatuses of a PC or a server connected to a surveillance camera perform image analysis for detecting an object or estimating an attribute from an image captured by the surveillance camera. Recently, in conjunction with improvement in processing capacity of arithmetic apparatuses for mobile devices, a system for performing such image analysis on the surveillance camera side has been proposed. For implementation in such cases, in addition to placing the arithmetic apparatus in the surveillance camera body, embodiments in which a detachable device that is mounted on the surveillance camera and has a programmable arithmetic apparatus such as an FPGA executes at least a portion of the image analysis have been proposed. FPGA is an abbreviation for Field Programmable Gate Array. An arithmetic apparatus such as an FPGA needs to perform configuration using configuration data in order to set a circuit configuration. A detachable device is provided with a storage unit that stores configuration data, and when power is supplied to the detachable device, the configuration of arithmetic apparatus is performed using the configuration data stored in the storage unit.

The configuration data stored in the storage unit must be updated when an application is changed or when the arithmetic apparatus is updated. In such a case; the surveillance camera rewrites the configuration data stored in the storage unit via the arithmetic apparatus and causes the arithmetic apparatus to execute the configuration (hereinafter, referred to as reconfiguration). For example, when the communication between the surveillance camera and the detachable device is performed according to the communication protocol of the SD card standard, an initialization sequence is transmitted from the surveillance camera to the arithmetic apparatus when the power source of the surveillance camera is supplied. Incidentally, the initialization sequence is transmitted at a predetermined timing defined by the SD card standard (timing at which completion of configuration of the arithmetic apparatus is expected) and in a state (a voltage and a frequency) of a predetermined interface (IX), In accordance with this initialization sequence, the arithmetic apparatus sets the state (voltage and frequency) of the OF for the surveillance camera. Meanwhile, reconfiguration may be executed with the power left turned on in order to reduce the processing load until startup and to shorten the startup time. In such a case, no initialization sequence is transmitted from the surveillance camera. For this reason, an arithmetic apparatus such as a FPGA that lacks a means for maintaining a state prior to configuration cannot know what I/F state to start up with, and ends up being unable to transition to a state in which computation is possible.

Japanese Patent Laid-Open No. 2016-52057 describes a method of carrying over the state of the camera even after configuration. More specifically, when the shooting mode is switched, the current correction value of the camera is stored in the storage unit, the configuration of the arithmetic apparatus provided in the camera is performed, and after the configuration, the correction value stored in the storage unit is read out and set.

However, Japanese Patent Laid-Open No. 2016-52057 is a solution for a case where there is an arithmetic apparatus in the camera and cannot be applied to a device that is removably mounted to the camera. The main reason is that there is no solution to the following two issues. First, when an initialization sequence is not transmitted from the camera at the time of reconfiguration, since the initialization sequence cannot be requested from the arithmetic apparatus, it is necessary for the arithmetic apparatus to determine and set the state (voltage and frequency) of the I/F Second, if the camera is configured to transmit an initialization sequence at the time of reconfiguration, the arithmetic apparatus does not know the timing of the transmission. Therefore, there is a possibility that the initialization sequence will be transmitted after the arithmetic apparatus determines and sets the I/F voltage and frequency. At this time, if there is a difference between the state of the I/F of the arithmetic apparatus after the setting and the state of the I/F of the camera when the camera transmits the initialization sequence, the arithmetic apparatus will not be able to accept the initialization sequence and will not be able to transition to a state in which computation is possible.

SUMMARY OF THE DISCLOSURE

According to one aspect of the present disclosure, there is provided a technique that enables an I/F of an arithmetic apparatus to be set to an appropriate state even when a reconfiguration is performed in a detachable device.

According to one aspect of the present disclosure, there is provided a detachable device having an arithmetic apparatus and capable of attaching/detaching to/from an electric device, the detachable device comprising: an obtaining unit configured to obtain an instruction for a reconfiguration from the electric device; a saving unit configured to, prior to the reconfiguration being executed, save, to a storage unit, state information that represents a state of an interface of the arithmetic apparatus that is for receiving a signal from the electric device; and a setting unit configured to set the state of the interface using the state information after a predetermined standby time.

According to another aspect of the present disclosure, there is provided a method for controlling a detachable device having an arithmetic apparatus and capable of attaching/detaching to/from an electric device, the method comprising: obtaining an instruction for a reconfiguration from the electric device; prior to the reconfiguration being executed, saving, to a storage unit, state information that represents a state of an interface of the arithmetic apparatus for receiving a signal from the electric device; and setting the state of the interface using the state information after a predetermined standby time.

Further features of the present disclosure will become apparent from the following description of exemplary embodiments with reference to the attached drawings.

DESCRIPTION OF THE EMBODIMENTS

Figure 1:
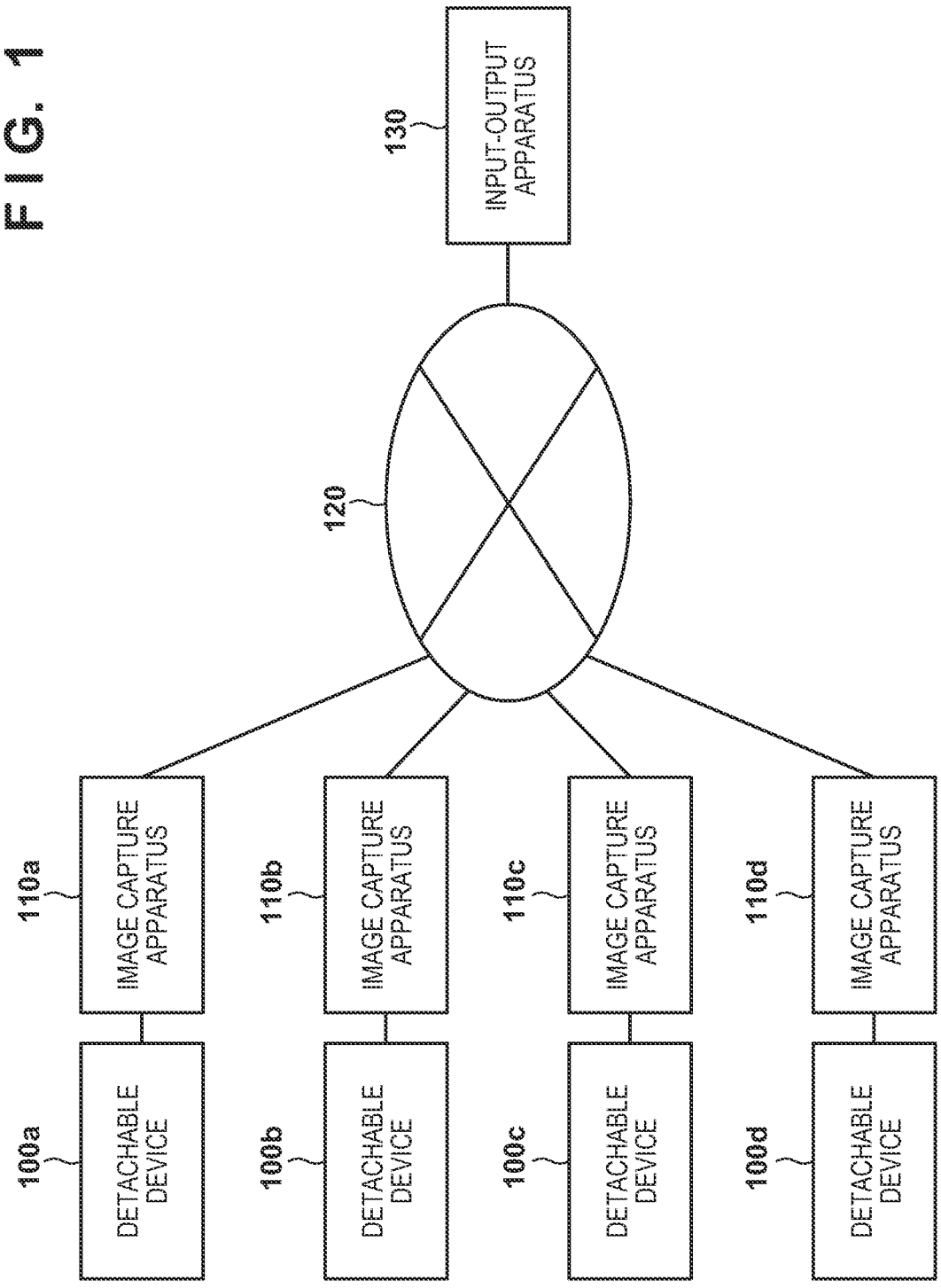
FIG. 1 is a diagram illustrating an example of a system configuration.

Hereinafter, embodiments will be described in detail with reference to the attached drawings. Note, the following embodiments are not intended to limit the scope of the present disclosure. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<System Configuration>

FIG. 1 illustrates a configuration example of the image analysis system of the present embodiment. In the following, as an example, a case in which the system is a specific person tracking system will be described. However, the present disclosure is not limited to this, and the following discussion can be applied to any system that analyzes an image and outputs predetermined information. The system includes image capture apparatuses 110a to 110d, a network 120, and an input-output apparatus 130. The image capture apparatuses 110a to 110d respectively have, for example, slots in which a device capable of recording a captured image can be attached and detached, and are connected to the detachable devices 100a to 100d by insertion of the detachable devices 100a to 100d into the slots. Hereinafter, the detachable devices 100a to 100d are referred to as "detachable device 100", and the image capture apparatuses 110a to 110d are referred to as "image capture apparatus 110". The image capture apparatus 110 is an example of the electric device capable of mounting a detachable device having an arithmetic apparatus.

The detachable device 101) is an arithmetic device that can be detached from the image capture apparatus 110. The detachable device 100 is, for example, a device in which a predetermined processing circuit that is an arithmetic apparatus is mounted on an SD card. The detachable device 100 may be configured to be entirely insertable into the image capture apparatus 110, for example, in the form of an SD card, so as to be connectable to the image capture apparatus 110 without a portion protruding from the image capture apparatus 110. Thus, it is possible to prevent the detachable device 100 from interfering with an obstacle such as wiring, and it is possible to increase the convenience at the time of use of the device. In addition, since an SD card slot is prepared in many existing image capture apparatuses 110 such as network cameras, an extension function can be provided to an existing image capture apparatus 110 by the detachable device 100. Note that the detachable device 100 may be configured to be attached to the image capture apparatus 110 at least by any interface used when a storage device capable of storing an image captured by the image capture apparatus 110 is attached, in addition to the SD card embodiment. For example, the detachable device 100 may have a universal serial bus (USB) interface and be configured to be mounted in a USB socket of the image capture apparatus 110. The arithmetic apparatus is implemented by, for example, an FPGA programmed to execute a predetermined process, but may be implemented in other forms (e.g., other programmable logic devices (PLDs)). FPGA is an abbreviation for Field Programmable Gate Array.

The image capture apparatus 110 is an image capture apparatus such as a network camera. In the present embodiment, an arithmetic apparatus capable of processing an image is integrated into the image capture apparatus 110, but the present disclosure is not limited thereto. For example, an external computer such as a PC (Personal Computer) connected to the image capture apparatus 110 may exist, and a combination thereof may be treated as the image capture apparatus 110. In the present embodiment, it is assumed that detachable devices 100 are mounted on all of the image capture apparatuses 110. Although FIG. 1 illustrates four image capture apparatuses 110 and detachable devices attached to each of them, the number of combinations of these apparatuses may be three or less, or five or more. By the detachable device 100 having an image analysis processing function being mounted to the image capture apparatus 110, even if the image capture apparatus 110 does not have an image analysis processing function, it is possible to execute the video processing on the image capture apparatus 110 side. Further, in a form in which an arithmetic apparatus for video processing is arranged in the image capture apparatus 110, as in the present embodiment, by a detachable device 100 in which the arithmetic apparatus is disposed being mounted on the image capture apparatus 110, it is possible to diversify and improve the image processing that can be executed on the image capture apparatus 110 side.

The input-output apparatus 130 is an apparatus for accepting input from a user or outputting information to a user (for example, displaying information). In the present embodiment, for example, the input-output apparatus 130 is a computer such as a PC, and input-output of information is performed by a browser or a native application installed in the computer.

The image capture apparatus 110 and the input-output apparatus 130 are communicably connected via the network 120. The network 120, for example, is configured to include a plurality of routers satisfying a communication standard such as Ethernet (registered trademark), a switch, a cable, or the like. In the present embodiment, the network 120 may be any network that enables communication between the image capture apparatus 110 and the input-output apparatus 130, and may be constructed according to any size, configuration, or compliant communication standard. For example, the network 120 may be the Internet, a wired LAN (Local Area Network), a wireless LAN, a WAN (Wide Area Network), or the like. The network 120 may also be configured to allow for communications over, for example, an ONVIF (Open Network Video Interface Forum) standard compliant communication protocol. However, the network 120 is not limited to this, and may be configured to allow communication in other communication protocols such as a unique communication protocol, for example.

<Apparatus Configuration>
(Configuration of Image Capture Apparatus)

Figure 2:
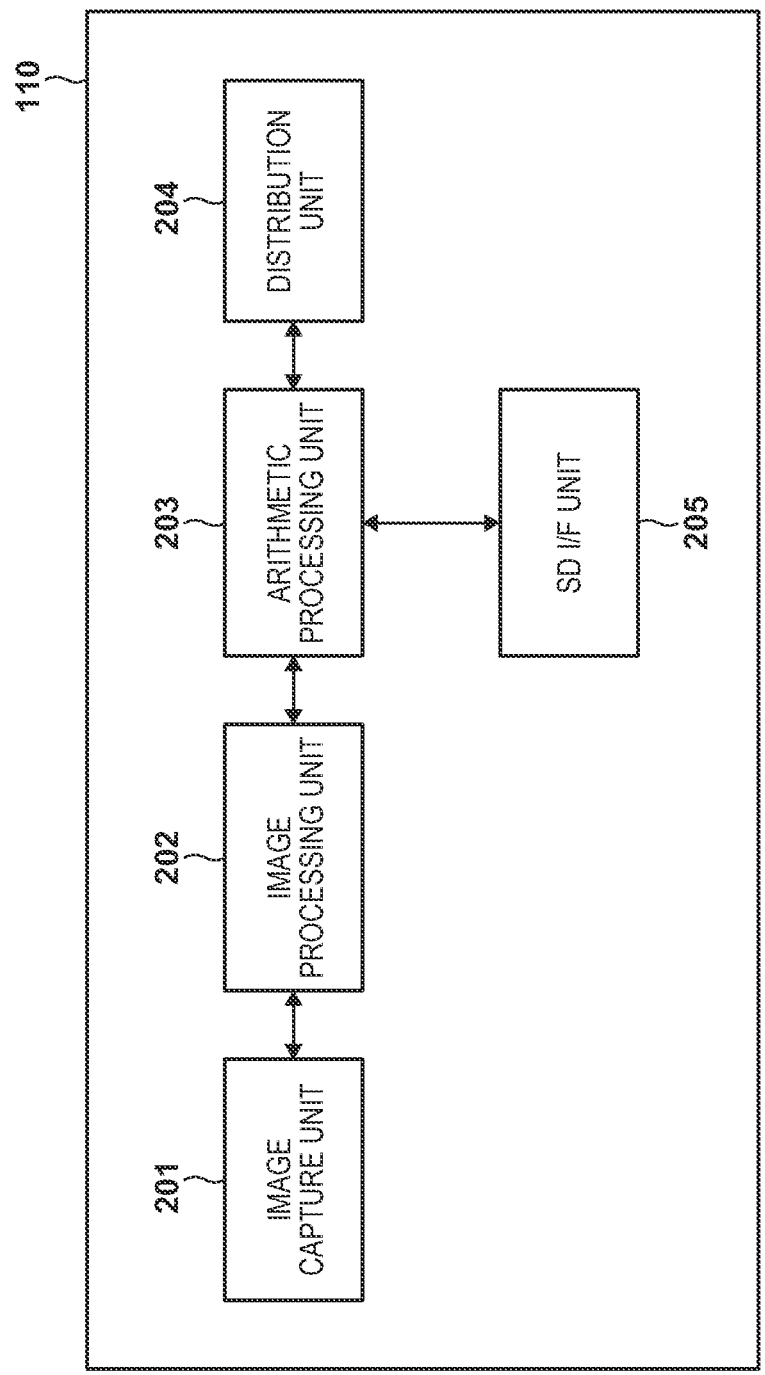
FIG. 2 is a diagram illustrating an example of a hardware configuration of an image capture apparatus.

Next, the configuration of the image capture apparatus 110 will be described. FIG. 2 is a diagram illustrating an example of a hardware configuration of the image capture apparatus 110. The image capture apparatus 110, as its hardware configuration, includes the image capture unit 201, the image processing unit 202, the arithmetic processing unit 203, the distribution unit 204, and an SI) IX unit 205, for example. I/F is an abbreviation for interface.

The image capture unit 201 is configured to include a lens unit for focusing light, and an image capture element for converting an analog signal corresponding to focused light. The lens unit has a zoom function for adjusting an angle of view, an aperture function for adjusting an amount of light, and the like. The image capture element has a gain function for performing sensitivity adjustment when converting light into an analog signal. These functions are adjusted based on setting values notified from the image processing unit 202. An analog signal obtained by the image capture unit 201 is converted into a digital signal by an analog-to-digital conversion circuit, and is transferred as an image signal to the image processing unit 202.

The image processing unit 202 includes an image processing engine, peripheral devices thereof, and the like. Peripheral devices include, for example, a RAM (Random Access Memory) or drivers of the respective I/F. In the image processing unit 202, the image signal obtained from the image capture unit 201 is subjected to image processing such as, for example, development processing, filtering processing, sensor correction, noise removal, and the like to generate image data. Further, the image processing unit 202 may execute exposure adjustment so that a set value is transmitted to the lens unit or the image capture element and an appropriate exposure image can be obtained. The image data generated by the image processing unit 202 is transferred to the arithmetic processing unit 203.

The arithmetic processing unit 203 includes one or more processors such as a CPU or an MPU, a memory such as a RAM or a ROM, and a driver for each I/F. It should be noted that CPU is an acronym for Central Processing Unit, MPU is an acronym for Micro Processing Unit, RAM is an acronym for Random Access Memory, and ROM is an acronym for Read Only Memory. In one example, the arithmetic processing unit 203 determines an assignment of which of the image capture apparatus 110 and the detachable device 100 is to execute each part of the processing to be executed in the above-described system, and executes processing corresponding to the determined assignment. Details of the processing and the assignment of the processing will be described later. An image received from the image processing unit 202 is transferred to the distribution unit 204 or the SD I/F unit 205. Data of a processing result is also transferred to the distribution unit 204.

The distribution unit 204 includes a network distribution engine and peripheral devices such as a RAM and an ETH PHY module. The ETH PHY module is a module that executes Ethernet physical (PHY) layer processes. The distribution unit 204 converts the image data and the processing result data obtained from the arithmetic processing unit 203 into a format that can be distributed to the network 120, and outputs the converted data to the network 120, The SD I/F unit 205 is an interface portion for connecting with the detachable device 100 and is configured to include, for example, a power supply and a mounting mechanism for an attachment-detachment socket or the like for attaching/detaching the detachable device 100, Here, it is assumed that the SD I/F unit 205 is configured in accordance with the SD card standard established by the SD Association. Transfer of images obtained from the arithmetic processing unit 203 to the detachable device 100, and communication between the detachable device 100 and the image capture apparatus 110 for obtaining data from the detachable device 100 or the like is performed through the SD I/F unit 205.

Figure 3:
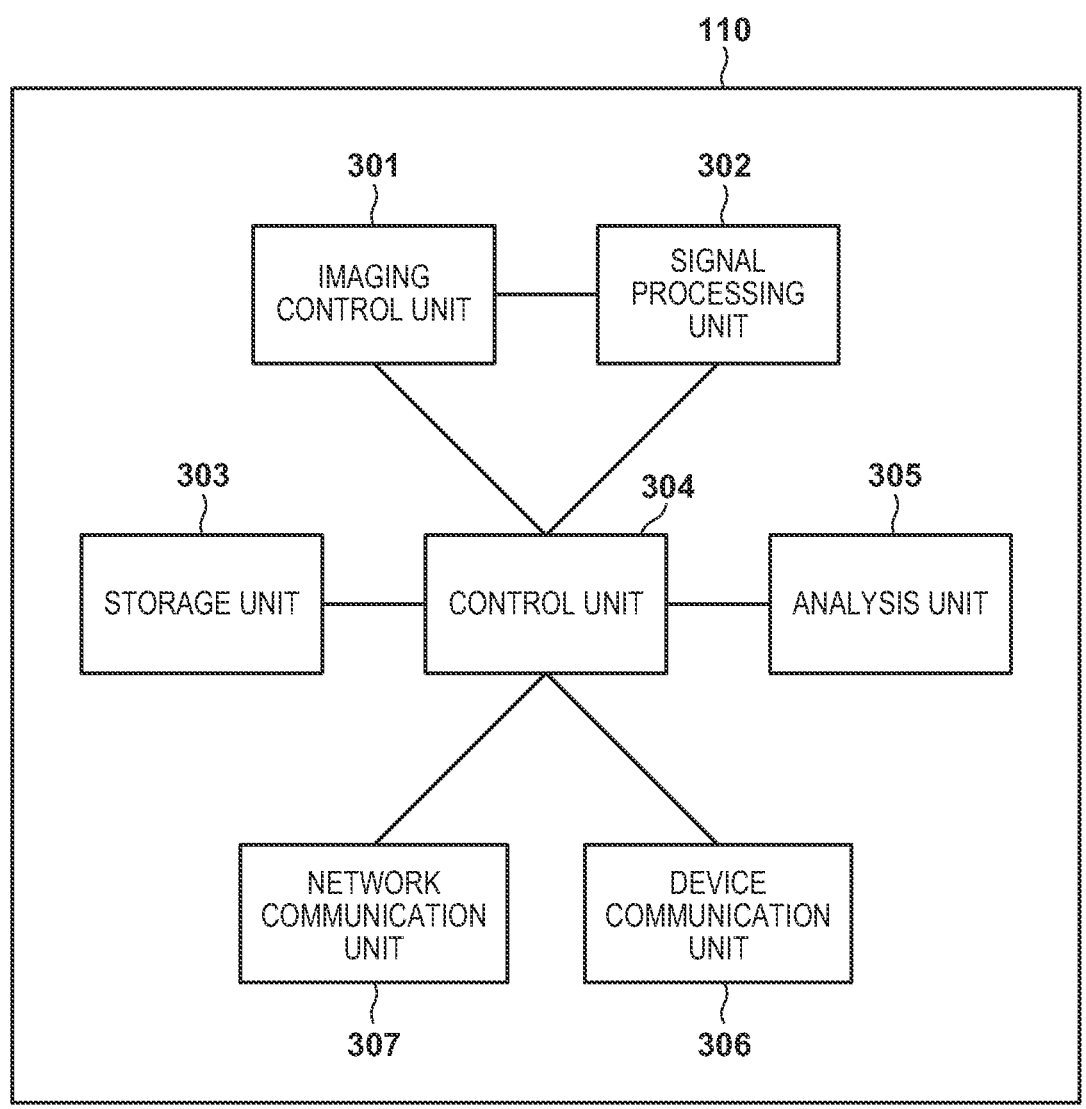
FIG. 3 is a diagram illustrating an example of a functional configuration of the image capture apparatus.

FIG. 3 illustrates a functional configuration example of the image capture apparatus 110. The image capture apparatus 110 includes, as its functions, for example, an imaging control unit 301, a signal processing unit 302, a storage unit 303, a control unit 304, an analysis unit 305, a device communication unit 306, and a network communication unit 307.

The imaging control unit 301 executes control to capture the surrounding environment via the image capture unit 201. The signal processing unit 302 performs predetermined processing on an image captured by the imaging control unit 301 to generate data of the captured image. Hereinafter, the data of the captured image is simply referred to as a "captured image", The signal processing unit 302, for example, encodes an image captured by the imaging control unit 301. The signal processing unit 302 performs encoding on the still image using, for example, an encoding method such as JPEG (Joint Photographic Experts Group). Further, the signal processing unit 302, with respect to the moving image, performs encoding using an encoding method such as H.264/MPEG-4 AVC (hereinafter referred to as H.264), HEVC (High Efficiency Video Coding) or the like). Further, the signal processing unit 302 may encode an image from among a plurality of preset coding schemes using a coding scheme selected by the user, for example, through an operation unit (not illustrated) of the image capture apparatus 110.

The storage unit 303 stores a list of analysis processes that can be executed by the analysis unit 305 (hereinafter, referred to as a "first process list") and stores a list of post-processes to be performed on the results of the analysis processes. The storage unit 303 stores a result of analysis processing described later. In the present embodiment, although the processing to be executed is analysis processing, any processing may be executed, and the storage unit 303 may store a first process list and a post-process list for processing related to the processing to be executed. The control unit 304 controls each of the signal processing unit 302, the storage unit 303, the analysis unit 305, the device communication unit 306, and the network communication unit 307 so as to execute predetermined processing.

The analysis unit 305 selectively executes at least one of a pre-analysis process, an analysis process, and a post-analysis process, which will be described later, on the captured image. The pre-analysis process is processing to be executed on the captured image before the analysis process described later is executed. In the pre-analysis process of the present embodiment, as an example, a process of dividing a captured image to create a divided image is executed. The analysis process is a process of outputting information obtained by analyzing an input image. In the analysis process of the present embodiment, as an example, it is assumed that a process of executing at least one of a human body detection process, a face detection process, and a vehicle detection process with a divided image obtained by a pre-analysis process as an input and outputting a result of the detection process as a result of the analysis process is executed. The analysis processing may be, for example, a process configured to output the position of an object in a divided image using a machine learning model trained to detect an object contained in the image. The post-analysis process is a process executed after the analysis process is executed. An example of the post-analysis process of the present embodiment is a process of outputting, as a processing result, a total value of the number of objects detected in each divided image, based on the analysis processing result for each divided image. The analysis process may be a process of detecting an object in an image by performing pattern matching and outputting the position of the object.

The device communication unit 306 performs communication with the detachable device 100. The device communication unit 306 converts the inputted data into a format that can be processed by the detachable device 100, and transmits the data obtained by the conversion to the detachable device 100, The device communication unit 306 receives data from the detachable device 100, and converts the received data into a format that can be processed by the image capture apparatus 110. In the present embodiment, the device communication unit 306 executes a process of converting a decimal number between a floating-point format and a fixed-point format as a conversion process, but the present disclosure is not limited to this, and other processes may be executed by the device communication unit 306. In addition, in the present embodiment, the device communication unit 306 transmits a predetermined command sequence within the scope of the SD card standard to the detachable device 100, and performs communication with the detachable device 100 by receiving a response from the detachable device 100. The network communication unit 307 communicates with the input-output apparatus 130 through the network 120.

(Configuration of the Detachable Device)

Figure 4:
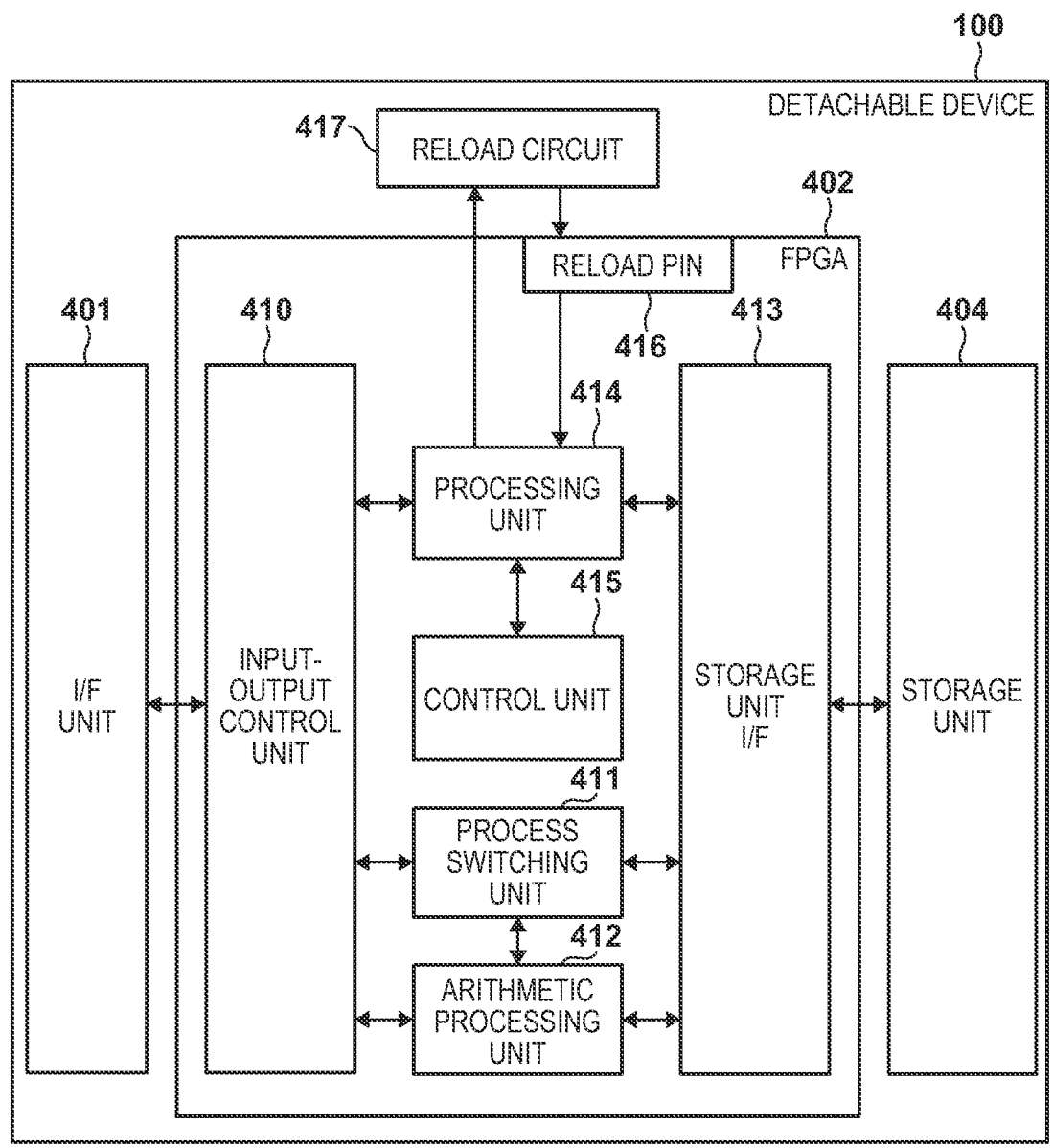
FIG. 4 is a diagram illustrating an example of a hardware configuration of a detachable device.

The detachable device 100 has an arithmetic apparatus composed of an FPGA or the like. FIG. 4 illustrates an example of a hardware configuration of the detachable device 100. The detachable device 100 is configured to include, for example, an OF unit 401, an FPGA 402, and a storage unit 404. The detachable device 100 is formed in a shape that can be inserted and removed in relation to the attachment-detachment socket of the SD I/F unit 205 of the image capture apparatus 110, specifically a shape that conforms to the SD card standard.

The I/F unit 401 is an interface portion for connecting an apparatus such as the detachable device 100 and the image capture apparatus 110. The IX unit 401, for example, is configured to include an electrical contact terminal or the like that receives power from the image capture apparatus 110 and generates and distributes a power for use in the detachable device 100. Like the SD I/F unit 205 of image capture apparatus 110, the IX unit 401 complies with the SD card standard with respect to items defined in the SD card standard. The acceptance of image and the setting data from the image capture apparatus 110, and transmission of data from the FPGA 402 to the image capture apparatus 110 is executed via the I/F unit 401.

The FPGA 402 includes an input-output control unit 410, a process switching unit 411, an arithmetic processing unit 412, a storage unit I/F 413, a processing unit 414, an I/F control unit 415, a reload pin 416, and a reload circuit 417. The FPGA 402 is a kind of semiconductor device which can reconfigure an internal logic circuit structure repeatedly. The processing implemented by the FPGA 402 can add (provide) processing functionality to an apparatus to which the detachable device 100 is attached. Also, the FPGA 402 reconfiguration function allows the logic circuit structure to be changed later, so that attaching the detachable device 100 to a type of apparatus for which technology advances rapidly for example, enables the apparatus to execute the appropriate processing in a timely manner. In the present embodiment, an example in which an FPGA is used will be described, but a general-purpose ASIC or a dedicated LSI may be used, for example, as long as a process described later can be realized. The FPGA 402 is activated by writing setting data (i.e., configuration data) including information of the logic circuit structure to be generated from a dedicated IX or by reading the setting data from the dedicated IX. In the present embodiment, it is assumed that the setting data is held in the storage unit 404. When the power is supplied, the FPGA 402 reads out the setting data from the storage unit 404 via the storage unit I/F 413, generates a logical circuit, and starts the logical circuit. However, the present disclosure is not limited thereto; for example, by implementing a dedicated circuit in the detachable device, via the IX unit 401, the image capture apparatus 110 may write the setting data to the FPGA 402.

The input-output control unit 410 is configured to include a circuit for transmitting/receiving an image to/from the image capture apparatus 110, a circuit for analyzing a command received from the image capture apparatus 110, and a circuit for performing control based on the analysis result, and the like. The commands are defined in the SD card standard, and the input-output control unit 410 can detect some of them. Function details will be described later. The input-output control unit 410 transmits an image to the arithmetic processing unit 412 in the case of image analysis processing, and transmits an initialization sequence and a reconfiguration instruction to the processing unit 414 in the case of receiving an initialization sequence and a reconfiguration instruction from the image capture apparatus. Furthermore, the input-output control unit 410, when receiving setting data for the switching of the processing, transmits the setting data to the process switching unit 411.

The process switching unit 411 is configured to include a circuit for, based on the setting data received from the image capture apparatus 110, obtaining information of the image analysis processing function from the storage unit 404, and writing it to the arithmetic processing unit 412. The information of the image analysis processing function is, for example, a setting parameter indicating the order and type of computation to be processed in the arithmetic processing unit 412, coefficients of the computation, or the like.

The arithmetic processing unit 412 is configured to include a plurality of arithmetic circuits necessary for executing the image analysis processing function. The arithmetic processing unit 412 executes each arithmetic process based on the information of the image analysis processing function received from the process switching unit 411, transmits the processing result to the image capture apparatus 110, and/or records the processing result in the storage unit 404.

In this manner, the FPGA 402 extracts the setting data of the processing function to be executed, which is included in the setting data corresponding to the plurality of processing functions held in advance, and rewrites the processing content executed by the arithmetic processing unit 412 based on the extracted setting data. As a result, the detachable device 100 can selectively execute at least one of the plurality of processing functions. Further, by adding the setting data of the process to be newly added as needed, the latest process can be executed on the image capture apparatus 110 side, Incidentally, in the following, having a plurality of setting data corresponding to each of the plurality of processing functions will be expressed as having a plurality of processing functions. That is, even when the FPGA 402 of the detachable device 100 is configured to execute one processing function, when it is capable of changing the processing content of the arithmetic processing unit 412 by the setting data for another processing function, it is expressed as having a plurality of processing functions.

The storage unit I/F 413 is configured to include a circuit for converting the format of data received from the respective components into a protocol suitable for the storage unit 404 and for transmitting and receiving the data. The storage unit IN 413 supports some of the commands corresponding to respective memory standards, and transmits/receives data between the respective components and the storage unit 404.

The storage unit 404 refers to a memory such as a flash memory or a DRAM, and may be non-volatile or volatile. The storage unit 404 stores various types of information such as storage data written from the image capture apparatus 110, information on an image analysis processing function written to the arithmetic processing unit 412, and setting data (configuration data) of the FPGA 402. The storage unit 404 saves state information indicating a state of the I/F (voltage and frequency) at the time of occurrence of the reconfiguration instruction, and a reconfiguration flag indicating that the reconfiguration instruction has occurred or that the state information has been saved. This information will be made clear from the following description.

When the initialization sequence is received from the input-output control unit 410, the processing unit 414 transmits the state information of the (hereinafter, also referred to as I/F information) to the IX control unit 415. Further, the processing unit 414 issues the reconfiguration flag when it receives the reconfiguration instruction, transmits the I/F information and the standby time together to the storage unit I/F 413, and stores them at a predetermined address of the storage unit 404. Here, the standby time refers to the time that the FPGA 402 waits for the initialization sequence during reconfiguration. A value of the standby time may be stored in advance in a non-volatile memory with sufficient time from a value of the time related to transmission of the initialization sequence defined in the SD card standard. The time obtained by measuring the time from release of the arithmetic apparatus Power On Reset (POR) of the processing unit 414 or other configuration of the detachable device 100 to receipt of the initialization sequence from the image capture apparatus 110 may be used as the standby time. For example, the standby time may be calculated by counting the number of clock ticks up to when the processing unit 414 receives the initialization sequence (step S905) after a POR of the FPGA 402 is released (step S902) when the power supply is supplied to the detachable device 100. Further, after receiving the reconfiguration instruction and transmitting the IX information to the storage unit 404, the processing unit 414 transmits a signal for controlling the reload pin 416 to the reload circuit 417.

The I/F control unit 415, based on the I/F information received from the processing unit 414, controls the IN state (voltage and frequency) of the FPGA 402. Changing the I/F voltage may be performed by switching the voltage supplied to a bank of the FPGA 402, or may be performed by selecting a bank to which a different voltage is supplied. A change in frequency can also be made by changing the frequency of a clock supplied from the image capture apparatus 110 to the detachable device 100.

The reload circuit 417 has a circuit configured discretely for reloading outside of the FPGA 402. When the FPGA 402 performs its own reloading, the reload circuit 417 is required. The reload circuit 417 receives a control signal of the reload pin 416 from the processing unit 414, and transmits a control signal to the reload pin 416. Here, after a configuration transition, all of signal pins of the FPGA 402 are in an open drain mode, and the reload circuit 417 pulls up the reload pin 416 to HIGH.

The reload pin 416 is a pin prepared for each device of the FPGA 402, and is configured as a control pin for instructing reconfiguration of the FPGA 402 by a control signal transmitted from the reload circuit 417, The FPGA 402 moves to a configuration state when the reload circuit 417 in response to an instruction of the processing unit 414 controls the reload pin 416 to LOW. Thereafter, the reload pin 416 is controlled to be HIGH by the reload circuit 417. Upon completion of the configuration, the FPGA 402 outputs a signal to make the reload pin 416 HIGH to the reload circuit 417.

Figure 5:
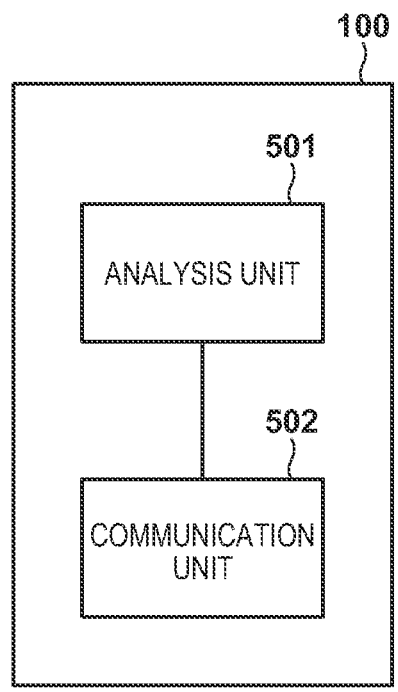
FIG. 5 is a diagram illustrating an example of a functional configuration of the detachable device.

FIG. 5 illustrates an example of a functional configuration of the detachable device 100. The detachable device 100 includes, for example, an analysis unit 501 and a communication unit 502 as its functional configuration. The analysis unit 501 executes analysis processing on the image. For example, when an analysis processing setting request is inputted, the analysis unit 501 executes a setting for enabling the inputted analysis processing to be executed. When an image is inputted, the analysis unit 501 executes an analysis process set to an executable state on the input image. In the present embodiment, the executable analysis processing is assumed to be a human body detection process and a face detection process, but the present disclosure is not limited thereto. For example, the processing may be a process (a later-described face authentication process) for determining whether a person stored in advance is included in an image. For example, a degree of coincidence between an image feature amount of a person stored in advance and an image feature amount of a person detected from an inputted image is calculated, and when the degree of coincidence is equal to or greater than a threshold value, it is determined that the person is a person stored in advance. For the purpose of privacy protection, a predetermined mask image may be superimposed on a person detected from the input image, or a mosaic process may be applied. Alternatively, the processing may be a process of detecting whether or not a person in an image is performing a specific action by using a learning model in which a specific action of the person is learned by machine learning. Further, it may be a process of determining what kind of region a region in the image is. For example, it is possible to use a learning model in which buildings, roads, people, sky, and the like are learned by machine learning to determine what kind of region the regions in the image are. As described above, the executable analysis processing can be applied to image analysis processing using machine learning or image analysis processing not using machine learning. Each of the above analysis processes may be performed in cooperation with the image capture apparatus 110, instead of being executed by the detachable device 100 alone. The communication unit 502 communicates with the image capture apparatus 110 via the I/F unit 401.

(Configuration of the Input-Output Apparatus)

Figure 6:
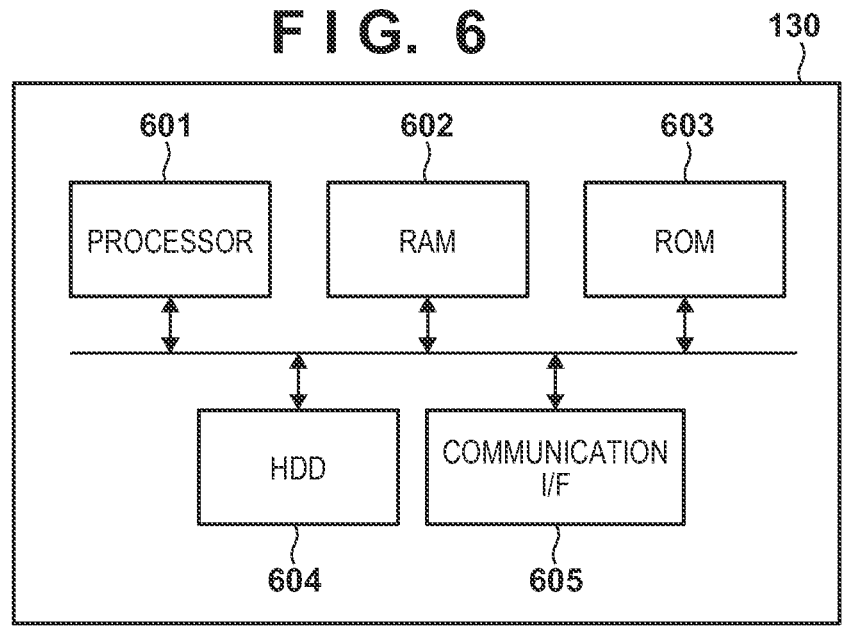
FIG. 6 is a diagram illustrating an example of a hardware configuration of an input-output apparatus.

An example of the hardware configuration of the input-output apparatus 130 is illustrated in FIG. 6. The input-output apparatus 130 is configured as a computer such as a conventional PC, and includes, for example, a processor 601 such as a CPU, a memory such as a RAM 602 or a ROM 603, a storage device such as an HDD 604, and a communication I/F 605 as illustrated in FIG. 6. The input-output apparatus 130 can execute various functions by the processor 601 executing a program stored in a memory or a storage device.

Figure 7:
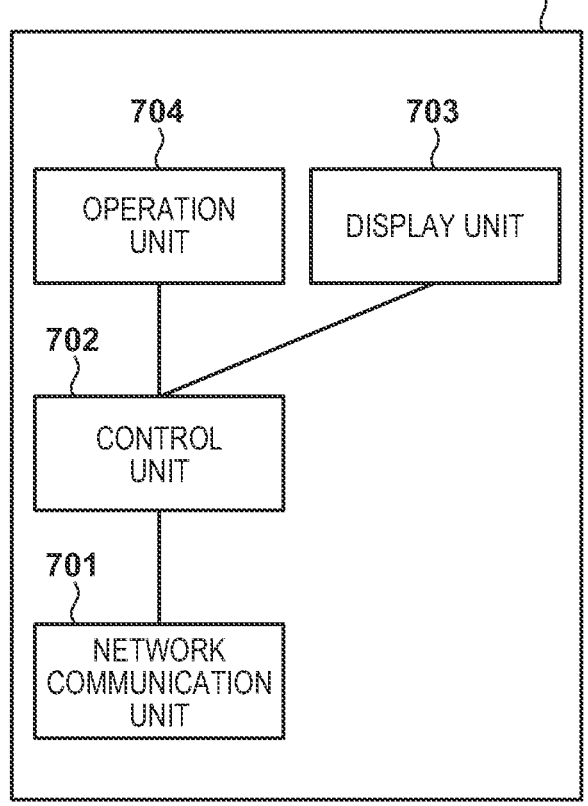
FIG. 7 is a diagram illustrating an example of a functional configuration of the input-output apparatus.

FIG. 7 illustrates an example of the functional configuration of the input-output apparatus 130 according to the present embodiment. The input-output apparatus 130 includes, as functional configurations, a network communication unit 701, a control unit 702, a display unit 703, and an operation unit 704, for example. The network communication unit 701 is connected to the network 120, for example, and executes communication with an external apparatus such as the image capture apparatus 110 via the network 120. It should be noted that this is merely an example, and for example, the network communication unit 701 may be configured to establish a direct connection with the image capture apparatus 110 and communicate with the image capture apparatus 110 without going through the network 120 or another apparatus. The control unit 702 controls the network communication unit 701, the display unit 703, and the operation unit 704 to execute respective processes. The display unit 703 presents information to the user, for example, via a display. In this embodiment, the information is presented to the user by displaying the results rendered by the browser on a display. The information may be presented by a method other than screen display such as voice or vibration. The operation unit 704 receives an operation from the user. In the present embodiment, it is assumed that the operation unit 704 is a mouse or a keyboard, and the user operates these to input a user operation to the browser. However, the present disclosure is not limited thereto, and the operation unit 704 may be an arbitrary device capable of detecting the intention of another user, such as a touch panel or a microphone, for example.

<Process Flow>

Next, an example of a flow of processing executed within the system will be described. Among each of the following processes, processes executed by the image capture apparatus 110 are realized by, for example, a processor in the arithmetic processing unit 203 executing a program stored in a memory or the like. However, this is merely an example, and part or all of the processing described later may be realized by dedicated hardware. The processing executed by the detachable device 100 or the input-output apparatus 130 may be realized by a processor in each apparatus executing a program stored in a memory or the like, or some or all of the processing may be realized by dedicated hardware.

(Overall Flow)

Figure 8:
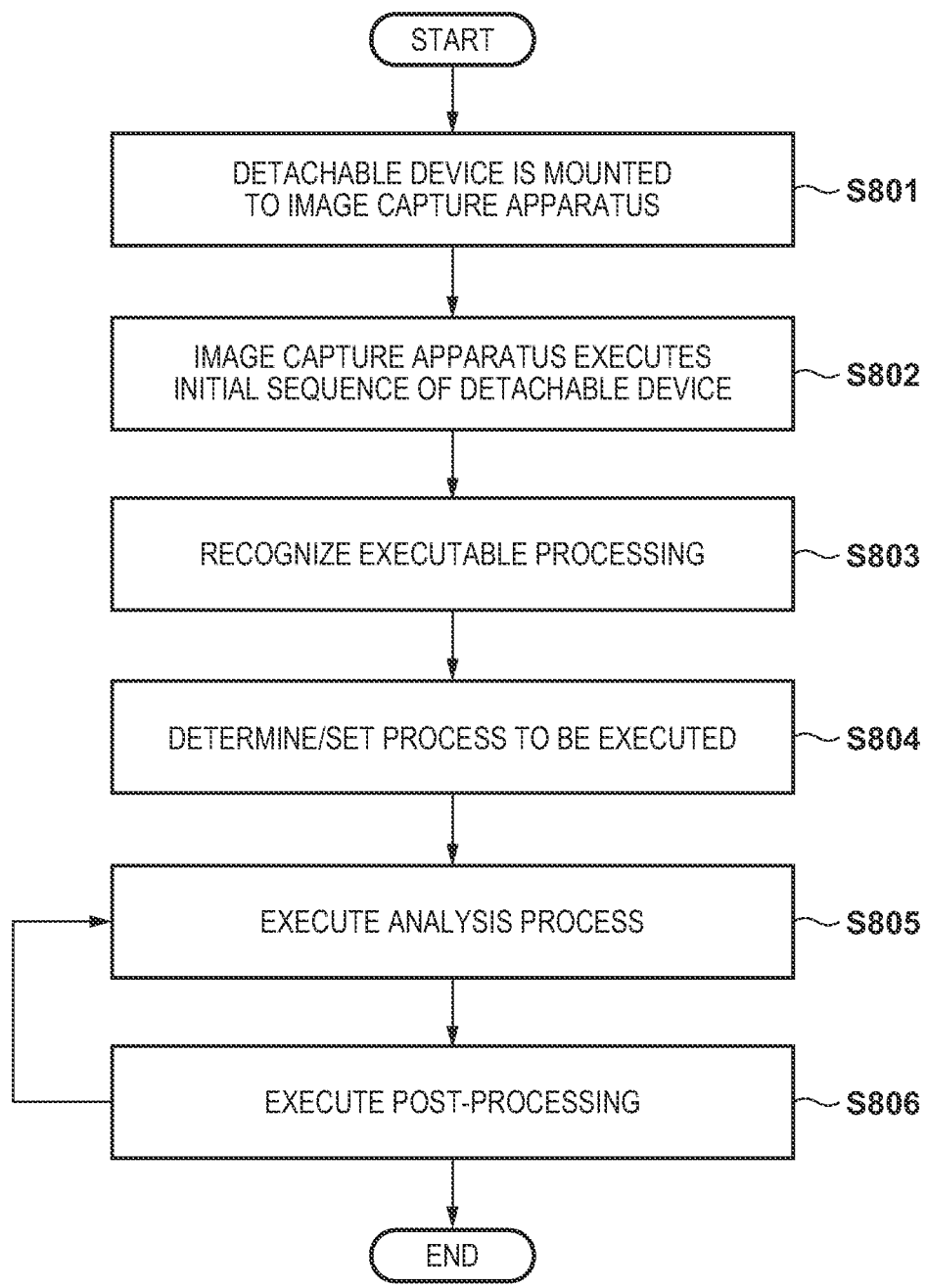
FIG. 8 is a diagram illustrating an example of a flow of processing executed by the system.

FIG. 8 schematically illustrates a flow of image analysis processing executed in the system. In this process, first, the user attaches the detachable device 100 to the image capture apparatus 110 (step S801), The image capture apparatus 110 executes an initialization sequence of the detachable device 100 (step S802), In this initialization sequence, when predetermined commands are transmitted and received between the image capture apparatus 110 and the detachable device 100, the image capture apparatus 110 enters a state in which the detachable device 100 is usable. Thereafter, the image capture apparatus 110 recognizes processing that the detachable device 100 can execute, and recognizes processing that can be executed locally (can be executed by the image capture apparatus 110 on its own or by a combination of the image capture apparatus 110 and the detachable device 100) (step S803). The detachable device 100 may be configured to be capable of executing any process, but processing unrelated to processing to be executed on the image capture apparatus 110 side need not be considered. In one example, the image capture apparatus 110 retains a list of executable processes obtained in advance from the input-output apparatus 130, for example. In this case, when the information indicating the processing that can be executed by the detachable device 100 is obtained from the detachable device 100, the image capture apparatus 110 can recognize only the processing that can be executed, depending on whether or not the processing is included in the list. Subsequently, the image capture apparatus 110 determines a process to be executed, and executes setting of the detachable device 100 as required (step S804). That is, when at least a part of the processing determined to be an execution target is executed by the detachable device 100, the setting of the detachable device 100 for the processing is executed. In this setting, for example, the FPGA 402 can be reconfigured using the setting data corresponding to the process to be executed. Then, the image capture apparatus 110 or detachable device 100 executes an analysis process (step S805). Thereafter the image capture apparatus 110 executes post-processing (step S806). Step S805 and step S806 processes are repeatedly executed. The processing of FIG. 8 is executed, for example, when the power source of the image capture apparatus 110 is supplied or when the detachable device 100 is mounted. In addition, when the detachable device 100 is detached, for example, at least a part of the processing of FIG. 8 may be executed again, such as repeatedly executing the processing of step S803.

(Flow of Configuration Processing in Detachable Device)

Figure 9:
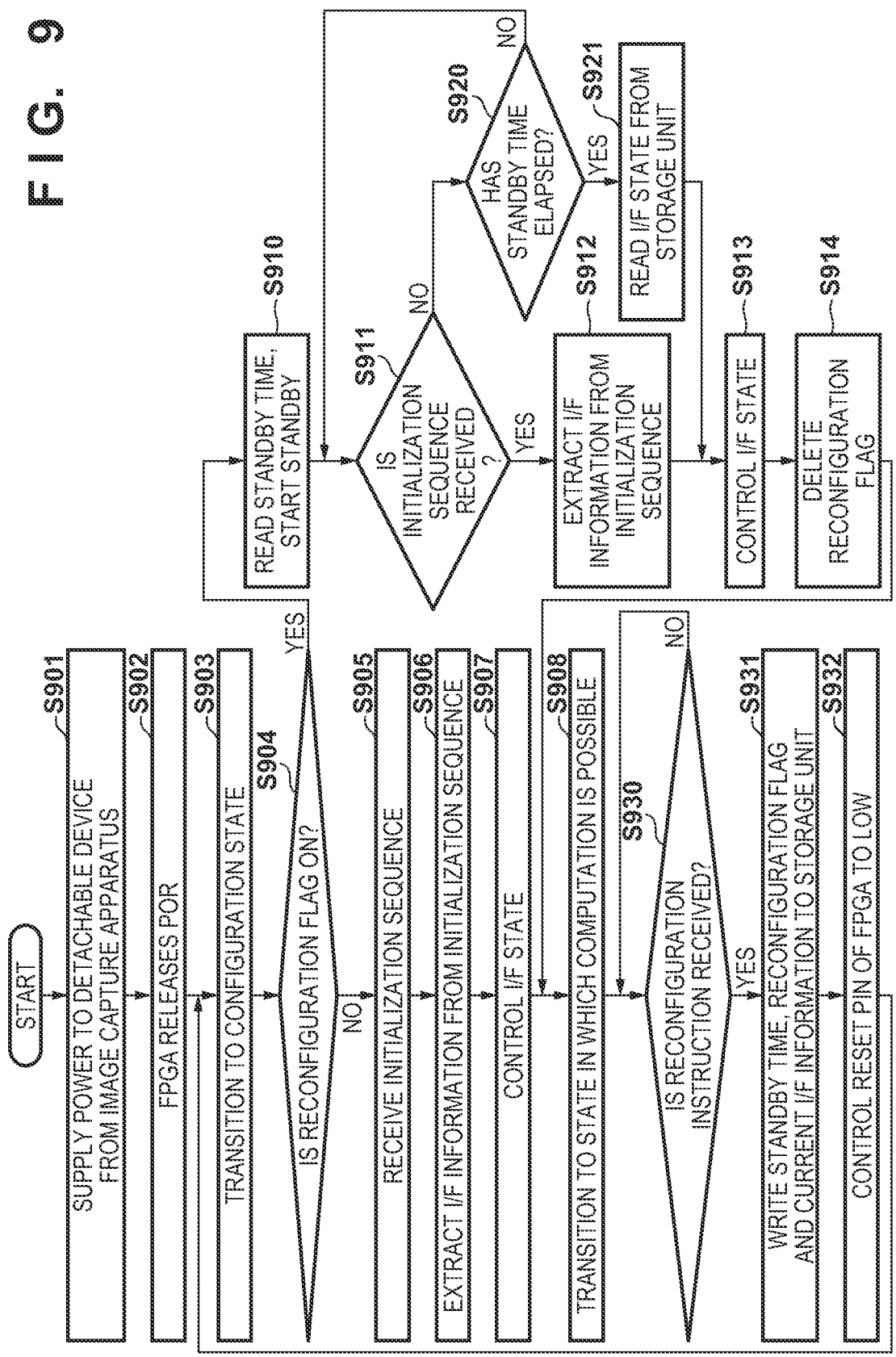
FIG. 9 is a view illustrating a reconfiguration flow of the detachable device.

FIG. 9 illustrates a processing flow by the FPGA 402 for realizing an image analysis system according to the present embodiment. With reference to FIG. 9, a flow of processing when power is supplied to the detachable device 100 for the first time and a flow of processing when reconfiguration is performed will be described. First, referring to step S901 to step S908, the flow when the power is supplied for the first time to the detachable device 100 will be described.

The image capture apparatus 110 supplies power to the detachable device 100 upon detecting that the detachable device 100 is mounted (step S901). The detachable device 100 is detected to be mounted, for example, by a mechanical switch in a connector of the image capture apparatus 110 being pressed and energized when the detachable device 100 is inserted into the connector. When power is supplied to the detachable device 100, the power supply configured to match the FPGA 402 starts in sequence. The FPGA 402 releases a Power On Reset (POR) when all the required power is supplied to the FPGA 402 (step S902).

When the POR is released, the FPGA 402 transitions to a configuration state and executes a configuration using configuration data saved in the storage unit 404 (step S903). When the configuration of the FPGA 402 is completed, the processing unit 411 reads the reconfiguration flag stored in a predetermined address of the storage unit 404 through the storage unit I/F 413 (step S904). If power is supplied to the detachable device, that is, if it is not reconfigured, the reconfiguration flag is OFF. When reconfiguration flag=OFF (e.g., the value "0") is read (NO in step S904), the process proceeds to step S905.

When the power is supplied to the detachable device 100, an initialization sequence is transmitted from the image capture apparatus 110, so that the input-output control unit 410 of the FPGA 402 receives the initialization sequence via the I/F unit 401 (step S905), The input-output control unit 110 of the FPGA 402 transmits the received information to the processing unit 414 when it is determined that the received information is an initialization sequence. The processing unit 414 extracts the I/F information from the received initialization sequence, and transmits the OF information to the I/F control unit 415 (step S906). The I/F control unit 415 controls the IX state of the FPGA 402 in accordance with the received. OF information (step S907).

By controlling the I/F state in accordance with the IX information, the FPGA 402 transitions to a state in which an arithmetic process is possible for data transmitted from the image capture apparatus 110 (hereinafter, a state in which computation is possible) (step S908).

By the above steps, when the power is supplied to the detachable device 100, the FPGA 402 transitions to a state in which computation is possible. Next, in step S930 to step S932, processing performed when a reconfiguration instruction is transmitted from the image capture apparatus 110 when the FPGA 402 of the detachable device 100 is in a state in which computation is possible will be described.

After the FPGA 402 in step S908 transitions to a state in which computation is possible, the processing unit 414 determines whether it has received a reconfiguration instruction from the image capture apparatus 110 (step S930), If the reconfiguration instruction has not been received (NO in step S930), a state in which computation is possible continues. The reconfiguration instruction is transmitted to the processing unit 414 via the I/F unit 401 of the detachable device 100 and the input-output control unit 410 of the FPGA 402. The reconfiguration instruction is issued in a case where a layer configuration of a neural network is to be changed when a deep learning model (DL model) stored in the storage unit 401 is to be changed, in a case where the operating frequency of the FPGA 402 is changed in accordance with the temperature, and the like. Here, the layer configuration of the neural network refers to Mobilenet, VGG8 and Resnet, etc. The reconfiguration instruction may be automatically transmitted by the image capture apparatus 110, or may be transmitted by an instruction operation from a user who operates the input-output apparatus 130.

Upon reception of the reconfiguration instruction (YES in step S930), the processing unit 414 respectively stores the standby time, the reconfiguration flag in the ON state, and the current I/F information in a predetermined address of the storage unit 404 via the storage unit 413 (step S931). When the standby time is stored in a predetermined address of the nonvolatile memory, it is not necessary to store the standby time at a predetermined address of the storage unit 404. This is because the processing unit 414 can obtain the standby time from the predetermined address of the nonvolatile memory. However, when the standby time is measured, since the time is more suitable for the configuration than a standby time specified by the SD card standard, it is preferably updated. After storing the reconfiguration flag and the I/F information in the storage unit 404, the processing unit 414 transmits a control signal for controlling the reload pin 416 to LOW via the reload circuit 417 (step S932). As a result, the reload pin 416 is controlled to be LOW. Thereafter, the process proceeds to step S903. The process of reconfiguration executed in step S903, step S904, and step S910 to step S921 will be described below.

After controlling the reload pin 416 to LOW, the FPGA 402 transitions to the configuration state (step S903). The reload pin 416 is in the open drain mode, but is controlled to HIGH after transitioning to the configuration state because it is pulled up by the reload circuit 417, After transitioning to the configuration state, the processing unit 414 reads a reconfiguration flag stored in a predetermined address of the storage unit 404 through the storage unit I/F 413 (step S904), if a reconfiguration instruction is used to execute the configuration, step S931 sets the reconfiguration flag to ON; therefore, the process transitions to step S910 (YES in step S904).

When an ON state reconfiguration flag is read, the processing unit 414 reads the standby time stored in the storage unit 404, starts the standby, and starts monitoring the elapse of the standby time (step S910), A value of the standby time may be stored in advance in the storage unit 404 with sufficient time from a value of a time related to transmission of the initialization sequence defined in the SD card standard, for example. Needless to say, the present disclosure is not limited to this, and for example, the standby time calculated by the FPGA 402 may be stored in the storage unit 404. Here, the standby time is calculated by counting the number of clock ticks from when the POR of the FPGA 402 is released in step S902 to when the initialization sequence is received in step S905 when the power is supplied to the detachable device 100. Furthermore, by multiplying the frequency of the clock with the calculated number of clocks, the standby time expressed in real time may be calculated.

If the input-output control unit 410 detects that an initialization sequence has been received (YES in step S911), the process proceeds to step S912, and if not (NO in step S911), the process proceeds to step S920. Processing unit 414 determines whether or not the standby time has elapsed, and returns the process to step S911 if the standby time has not elapsed (NO in step S920). Thus, until the standby time of the standby started in step S910 has elapsed, the processing unit 414 will wait for reception of the initialization sequence from the image capture apparatus 110. If the initialization sequence is received prior to the elapse of the standby time (YES in step S911), the processing unit 414 extracts the I/F information from the received initialization sequence, and transmits the I/F information to the I/F control unit 415 (step S91.2). The I/F control unit 415, based on the I/F information received from the processing unit 414, controls the OF state of the FPGA 402 (step S913). After the I/F state is controlled, the processing unit 414 deletes the reconfiguration flag saved in the storage unit 404 (step S914), thereby disabling the I/F information saved in the storage unit 404, and then transitions to a state in which computation is possible (step S908). At this time, the IX information itself may be deleted. Incidentally, when the configuration is completed, in the reload circuit 417, the signal for controlling the reload pin 416 is controlled to maintain HIGH.

On the other hand, if the processing unit 414 does not receive the initialization sequence from the image capture apparatus 110 before the standby time elapses (YES in step S920), the process proceeds to step S921. For example, the processing unit 414 counts the number of clock ticks from the start of the standby, if the number of clock ticks counted before receiving the initialization sequence is more than the standby time, the processing unit 414 determines that the initialization sequence is not to be transmitted from the image capture apparatus 110. In this instance, the processing unit 414 reads out the I/F information stored in step S931 from the storage unit 404, and transmits the I/F information to the I/F control unit 415 (step S921). Thereafter, the process proceeds to step S913. Processing after step S913 is as described above.

<Variation on Storage Unit 404>

Assume that the detachable device 100 is taken out of the image capture apparatus 110 with the reconfiguration flag of the storage unit 404 set to ON, and then inserted into a different image capture apparatus. When the storage unit 404 is a non-volatile memory, the ON state of the reconfiguration flag is maintained. Therefore, there is the possibility that the FPGA 402 will determine that the configuration is based on a reconfiguration instruction, and the initialization operation would not be performed correctly. Therefore, in the process illustrated in FIG. 9, the state information is invalidated by clearing the reconfiguration flag (step S914) after reconfiguration is completed. However, the timing of this invalidation, that is, the timing at which the reconfiguration flag is cleared (turned OFF) need only be before the detachable device 100 is powered off. For example, the reconfiguration flag may be cleared when unbinding (disconnection) of the detachable device 100 is instructed. Alternatively, for example, the reconfiguration flag may be cleared immediately after the reconfiguration flag is determined to be ON (e.g., between step S904 and step S910). Meanwhile, if volatile memory is used to save the reconfiguration flag, the data is erased when the power is turned off, so the process of clearing the reconfiguration flag can be omitted.

<Variation on Control of I/F Voltage>

Instead of storing the I/F voltage information in the storage unit 404, the control of the I/F voltage can be performed by confirming whether or not the reconfiguration flag is ON state and whether or not the voltage of the signal line connected to the image capture apparatus 110 exceeds a threshold voltage of a bank to which 3.3 V is applied. In this case, when the threshold value is not exceeded, 1.8V is selected. By using this method, it is possible to reduce the information stored in the storage unit 404.

<Variation of Configuration of I/F Control Unit 415>

Figure 10:
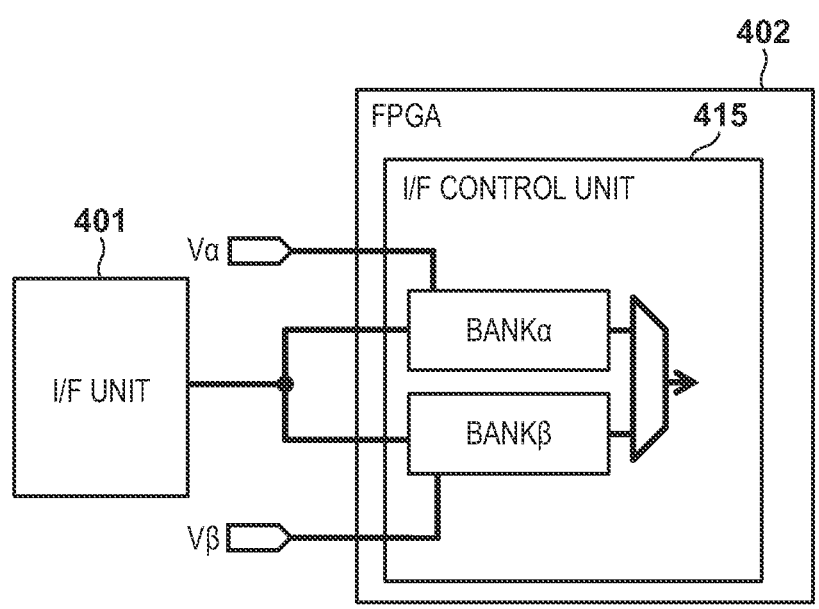
FIG. 10 is a diagram illustrating an example of a configuration of a terminal in an OF control unit of the detachable device.

When supporting the SD card standard of UHS-I or higher, the I/F voltage of the SD card need to be changed from 3,3V. FIG. 10 illustrates an example of a configuration of a terminal in the I/F control unit 415. When the detachable device 100 is made to support UHS-I or the like, since it is difficult to dynamically switch the terminal voltage of the FPGA 402, two banks are used, Vα is connected to one bank and Vβ to the other to make a stub wire. Here, Vα and Vβ are different voltages. The OF control unit 415 performs switching of the voltage to be used by masking an unused bank based on the I/F voltage information of the initialization sequence.

As described above, according to the above embodiment, even when reconfiguring in a detachable device, it is possible to appropriately set an I/F state of an arithmetic apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s), The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021.003014, filed Jan. 12, 2021, which is hereby incorporated by reference herein in its entirely.

What is claimed is:

1. A detachable device having an arithmetic apparatus and capable of attaching/detaching to/from an electric device, the detachable device comprising:
an obtaining unit configured to obtain an instruction for a reconfiguration from the electric device;
a saving unit configured to, prior to the reconfiguration being executed, save, to a storage unit, state information that represents a state of an interface of the arithmetic apparatus that is for receiving a signal from the electric device; and
a setting unit configured to set the state of the interface using the state information after a predetermined standby time,
wherein when the setting unit saves the state information, the saving unit sets a flag that indicates that the reconfiguration was instructed, and
the setting unit, in a case where the flag is set, determines that the state information is saved in the storage unit.

2. The detachable device according to claim 1, wherein the setting unit, in a case where the state information is not saved in the storage unit, sets the interface based on an initialization sequence from the electric device.

3. The detachable device according to claim 1, wherein, after the setting unit obtains the state information from the storage unit, the setting unit disables the state information saved in the storage unit.

4. The detachable device according to claim 1, wherein the setting unit, in a case where it is determined that the state information is saved in the storage unit, disables the state information saved in the storage unit.

5. The detachable device according to claim 1, wherein the setting unit, in a case where a disconnection from the electric device is instructed, disables the state information saved in the storage unit.

6. The detachable device according to claim 3, wherein the storage unit is a nonvolatile memory.

7. The detachable device according to claim 1, wherein the setting unit, in a case where an initialization sequence is received from the electric device prior to the predetermined standby time elapsing, sets the state of the interface based on the initialization sequence.

8. The detachable device according to claim 7, further comprising: a measurement unit configured to measure a time from a release of a Power On Reset (POR) of the arithmetic apparatus until a receipt of the initialization sequence from the electric device,
wherein the time measured by the measurement unit is used as the predetermined standby time.

9. The detachable device according to claim 7, wherein the predetermined standby time is a time defined by an SD card standard with respect to reception of an initialization sequence.

10. The detachable device according to claim 1, wherein the state information includes a voltage and a frequency used for communication between the detachable device and the electric device.

11. The detachable device according to claim 1, wherein the setting unit, in a case where the state information is saved in the storage unit, sets a voltage of the interface based on a voltage of a signal line connected to the electric device.

12. The detachable device according to claim 1, wherein in the reconfiguration, configuration data of the arithmetic apparatus is rewritten with a power supply on.

13. The detachable device according to claim 1, wherein the arithmetic apparatus comprises a Field Programmable Gate Array.

14. A method for controlling a detachable device having an arithmetic apparatus and capable of attaching/detaching to/from an electric device, the method comprising:
- obtaining an instruction for a reconfiguration from the electric device;
- prior to the reconfiguration being executed, saving, to a storage unit, state information that represents a state of an interface of the arithmetic apparatus for receiving a signal from the electric device; and
- setting the state of the interface using the state information after a predetermined standby time,
- wherein when the state information is saved, a flag that indicates that the reconfiguration was instructed is set, and
- in a case where the flag is set, it is determined that the state information is saved in the storage unit.

* * * * *